Figure 1:
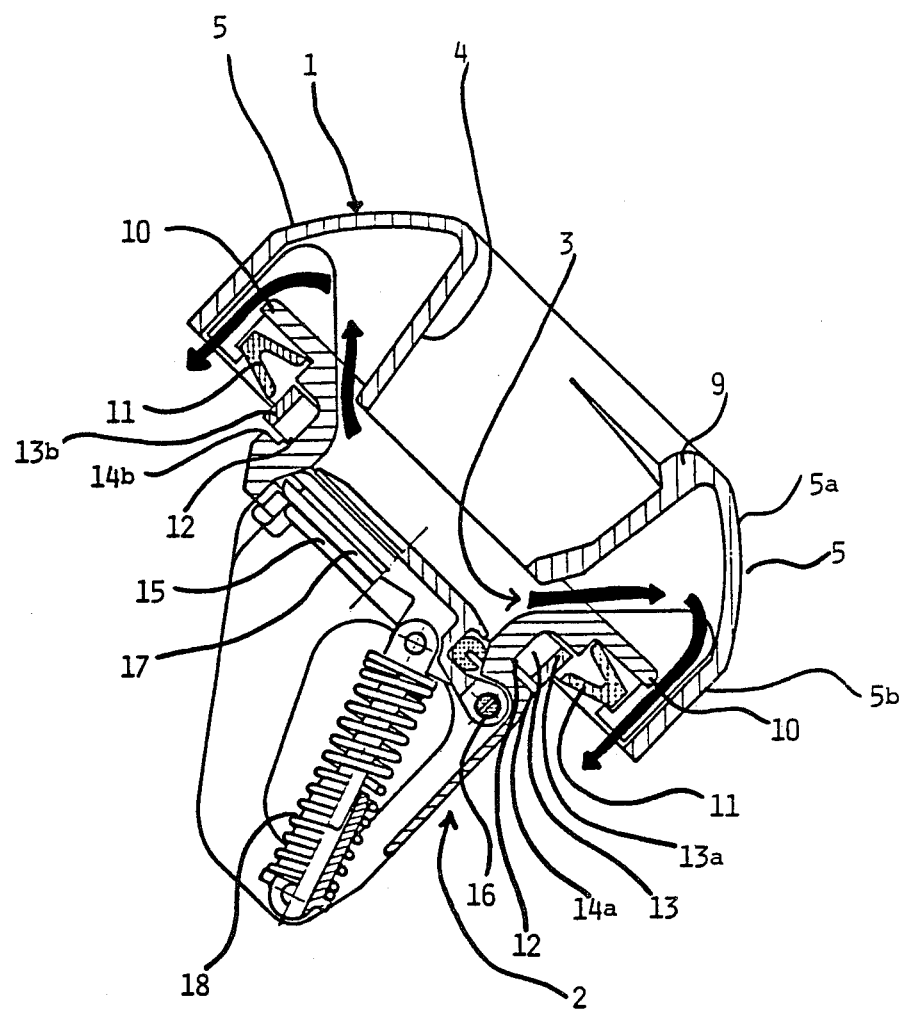

United States Patent [19]

Temmesfeld

[11] Patent Number: 4,762,247

[45] Date of Patent: Aug. 9, 1988

[54] ORIFICE RING FOR A FILLING CAP

[75] Inventor: Angelika B. Temmesfeld, Raubling, Fed. Rep. of Germany

[73] Assignee: Temtec Fahrzeugtechnik Entwicklungsgessellschaft mbH, Raubling, Fed. Rep. of Germany

[21] Appl. No.: 4,885

[22] Filed: Jan. 20, 1987

[30] Foreign Application Priority Data

Jan. 30, 1986 [DE] Fed. Rep. of Germany ....... 3602844

[51] Int. Cl.⁴ .............................................. B65D 5/16
[52] U.S. Cl. .................... 220/303; 220/86 R; 220/254; 220/367; 220/DIG. 33; 137/493; 210/172
[58] Field of Search ...... 220/86 R, 303, 254, 220/367, 208, DIG. 33; 210/172; 137/493, 588; 251/149.2

[56] References Cited

U.S. PATENT DOCUMENTS

| | | | |
|---|---|---|---|
| 1,982,879 | 12/1934 | Overbury | 220/86 R |
| 2,534,003 | 12/1950 | Culver et al. | 220/86 R |
| 3,730,216 | 5/1973 | Arnett et al. | 137/588 |
| 3,757,987 | 9/1973 | Marshall | 220/303 |
| 3,911,977 | 10/1975 | Berger | 220/86 R |
| 4,091,959 | 5/1978 | O'Banion | 220/86 R |
| 4,265,752 | 5/1981 | O'Banion | 220/303 |

FOREIGN PATENT DOCUMENTS

| | | |
|---|---|---|
| 2430253 | 1/1975 | Fed. Rep. of Germany . |
| 2336214 | 2/1975 | Fed. Rep. of Germany . |
| 2440986 | 2/1976 | Fed. Rep. of Germany . |
| 3406788 | 8/1985 | Fed. Rep. of Germany . |

Primary Examiner—George T. Hall
Attorney, Agent, or Firm—Helfgott & Karas

[57] ABSTRACT

An orifice ring (1) for fixing to a self-sealing fuel tank cap (2) is described. Orifice ring (1) has a guide tube part (4) connected to the fuel tank cap (2) while leaving an air gap (3), said tube part passing into an inverted over marginal region (5) at its side remote from the fuel tank cap.

11 Claims, 2 Drawing Sheets

ORIFICE RING FOR A FILLING CAP

The invention relates to an orifice ring for fixing to a selfsealing fuel tank cap.

A self-sealing fuel tank cap is e.g. known from DE-OS No. 34 06 788.

It is desirable for fuel tank caps, particularly those of the self-sealing type to be dimensioned in such a way that a filling gun can be inserted in a virtually positively engaging manner in the opening of the fuel tank cap. Such a construction permits a precise guidance of the filling gun. It ensures that the filling gun is not introduced in an unfavourable position into the fuel tank filling connection, which inconveniently frequently releases the automatic locking device of the filling gun. A positive adaptation of the fuel tank cap to the filling gun is also sought if the vehicle may only be filled with lead-free petrol. A constriction of the filling opening of the fuel tank cap to the diameter of the filling gun ensures that only such a filling gun for lead-free petrol, which normally has a larger diameter, can be introduced into the self-sealing fuel tank cap.

However, as a result of the virtually tight fit of the filling gun in the filling opening of the self-sealing fuel tank cap, the outflow of the vapours displaced from the vehicle tank due to the filling with fuel is made more difficult. These vapours must pass into the open through the remaining narrow annular clearance between the filling opening and the filling gun. As a result of the constricted flow cross-section said vapours achieve a high flow rate and blow into the face of the person who is filling the vehicle, which is dangerous and certainly unpleasant.

The problem of the present invention is to so further develop a self-sealing fuel tank cap that even in the case of a virtually tightly introduced filling gun the fuel vapours displaced from the tank can be led off safely and comfortably.

This problem is solved in that an orifice ring is fixed to the fuel tank cap, which has a guide tube part connected to said cap whilst leaving an air gap free, the side of the tube part remote from the fuel tank cap passing into an inverted over marginal region.

As a result of the orifice ring according to the invention and in particular its guide tube part, a reliable guidance of the filling gun is ensured. The guide tube part can be so adapted to the filling gun shape that there is only a clearance of a few millimetres between the guide tube part and the introduced filling gun, so that the latter assumes a clearly defined position, which permits troublefree filling, i.e. filling without splashing or spraying back fuel and without releasing the automatic blocking valve. The vapours displaced from the fuel tank as a result of the filling process can flow out via the air gap, without an excessive overpressure building up inside the tank. They are deflected in the interior of the inverted over marginal region and are uniformly outwardly distributed over the entire orifice ring circumference, so that the person filling the fuel tank is not endangered or annoyed by the vapours.

According to a particularly advantageous further development of the invention the inverted over marginal region surrounds the opening of the fuel tank connection, whilst leaving an air gap free. In the case of a marginal region inverted over to this extent, the fuel vapours passing out of the tank undergo a substantially 180° flow direction deflection and consequently flow away from the person filling the fuel tank. Due to the enclosure of the marginal region of the opening, the self-sealing fuel tank cap is protected against manipulations and in particular against theft. A particularly good dimensional stability of the orifice ring is obtained through longitudinal webs fitted to the inner wall of the inverted over marginal region.

According to a further advantageous embodiment the guide tube can contain a projection limiting the free opening of said guide tube. Such a projection is particularly suitable for preventing the insertion of particular filling guns.

According to an advantageous further development of the invention a bead-like web is arranged on the end of the guide tube remote from the fuel tank cap. This bead-like web can be hooked on to a corresponding projection or a shoulder on the outer wall of the filling gun, so that the latter is securely held and a slipping out of the filling connection is prevented.

According to another particularly advantageous embodiment of the invention the orifice ring is provided with locking means enabling it to be locked to the fuel tank cap. This is particularly advantageous from the manufacturing standpoint, because through the choice of a corresponding orifice ring the same fuel tank cap can be adapted to different filling gun configurations. It is also possible to provide orifice rings with guide tubes inclined with respect to the longitudinal axis of the filling connection and are preferably used in the case of sloping fuel filling connections, as a function of the vehicle type. As a result of the choice of a lockable orifice ring the fuel tank cap can be adapted to the specific requirement in a simple manner from the manufacturing standpoint.

If, according to a further advantageous embodiment of the invention, the locking means are so arranged in the interior of the inverted over marginal region that they are inaccessible when the orifice ring is locked on the fuel tank cap, both the orifice ring and said cap are secured against theft. According to another advantageous embodiment the locking means comprise two projections displaced by 180° from one another and in each case having an indentation or notch, into which can be engaged the radially projecting edge of the fuel tank cap. If, in this embodiment, the orifice ring is pressed onto the fuel tank cap, the latter undergoes an oval deformation by the projections running up onto the radial edge and the latter engages in the notches and then the orifice ring again assumes its original circular shape.

Through several axial stops fitted to the inner wall of the inverted over marginal region a further advantageous embodiment ensures a clearly defined positioning of the orifice ring.

Gripping notches on the outer wall of the inverted over marginal region, according to another advantageous embodiment, facilitate the fitting of the fuel tank cap, together with the mounted orifice ring in a vehicle filling connection.

The invention is described in greater detail hereinafter relative to non-limitative embodiments and the attached drawings, wherein show:

FIG. 1 An orifice ring according to the invention mounted on a self-sealing fuel tank cap in longitudinal section.

Figure 2:
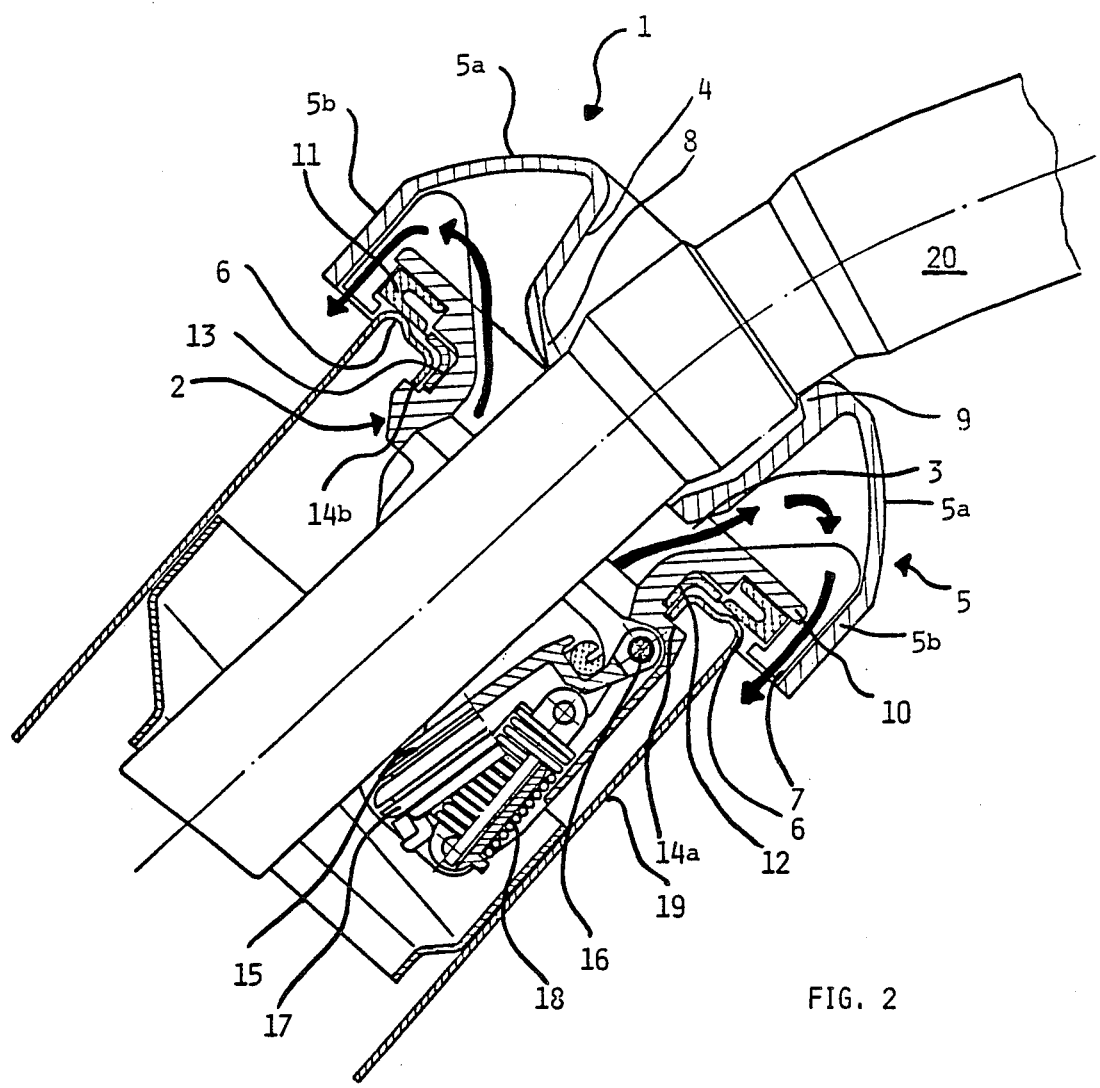

FIG. 2 An orifice ring with fuel tank cap, mounted in the fuel filling connection of a vehicle, the ring being adapted to the shape of the filling guns conventionally used for lead-free petrol.

FIG. 1 shows an orifice ring 1 in axial section. It has an approximately cylindrical guide tube 4, which passes into an inverted over marginal region 5, whilst leaving free an annular space. The marginal region has in the part connected onto the guide tube a bevel 5a roughly at 45° to the longitudinal axis of guide tube 4 and then passes into a cylindrical part 5b, which is roughly coaxial to guide tube 4. Over a centre angle of 180°, the guide tube is provided on its end remote from the vehicle filling connection with a bead 9, which is flattened towards its ends. Bead 9 engages behind a corresponding projection on the filling gun and prevents the latter from slipping out. On the inside of the cylindrical part 5b of the inverted over marginal region 5 are provided longitudinal webs, i.e. webs running parallel to the longitudinal axis of guide tube 4. However, it is not possible to see these webs in the sectional representation chosen in FIG. 1. By fitting these webs, even when choosing a limited wall thickness, it is possible to ensure an adequate inherent rigidity of orifice ring 1. Two facing webs are provided with a starting ramp and a notch, into which can be engaged a radially projecting edge 10 of a fuel tank cap 2. The axial position of the notch is chosen in such a way that in the engaged state an annular air gap 3 is left between the end of guide tube 4 and the fuel tank cap 2.

The radially projecting edge 10 of fuel tank cap 2 is located on the opening edge 6 of the fuel filling connection, a seal 11 being located below said edge 10. On the bottom of an all-round groove 12 on the neck of the fuel tank cap is placed a locking tooth system, on which is supported a not shown spring tongue of a locking ring 13 in the manner of a direction locking means. Locking ring 13 has two facing projections 13a, 13b. Below locking ring 13, i.e. further in the direction of the fuel tank, the fuel filling connection has two facing projections 14a, 14b.

The fuel tank cap is closed by a flap 15, which is pivotably mounted laterally in a joint 16. The flap engages with a seal 17 on a conical part of the neck of the fuel tank cap and is pretensioned in the direction of its closing position by a spring 18.

FIG. 2 shows another embodiment of an orifice ring, which differs from that of FIG. 1 in that it has a projection 8 bounded by the free opening of guide tube 4, so that it is only possible to insert filling guns with a specific configuration (those for lead-free petrol).

In FIG. 2 the arrangement comprising the fuel tank cap 2 and the mounted orifice ring 1 is placed on the fuel filling connection 19 of a vehicle. The vehicle fuel filling connection 19 is provided on its free end with an inwardly inverted over marginal region, which is perforated at two not shown facing points (internal bayonet lock). The two projections 14a, b of the fuel tank cap 2 and corresponding projections 13a, b of locking ring 13 are introduced through said marginal region. By clockwise rotation of orifice ring 1, which is preferably gripped by its inverted over marginal region 5, projections 14a, b run onto the inwardly directed edges of the inverted over marginal region of the fuel filling connection, edge 10 being pressed in the direction of the opening edge of the fuel filling connection, whilst deforming the elastic seal 11, in the same way as this takes place on placing a tank cap on the fuel filling connection. Projections 13a, b of locking ring 13 are held in the recesses of the marginal region during this rotary movement, so that the locking ring does not accompany the rotary movement and the fuel tank cap is fixed undetachably to the fuel filling connection as a result of the direction locking action of the locking ring.

Through the introduction of a filling gun 20, flap 15 is forced out of its closed position counter to the action of spring 18. As can be seen in FIG. 2, the filling gun 20 is virtually tightly engaged in guide tube 4, so that a reliable positioning of filling gun 20 is ensured. Vapours which escape during the filling of the fuel tank can pass into the opening along the thick drawn arrows.

I claim:

1. Orifice ring for fixing to a self-sealing fuel tank cap, characterized in that it has a guide tube part connected to the fuel tank cap, whilst leaving an annular-like air gap, the side of tube part remote from fuel tank cap passing into an inverted over marginal region.

2. Orifice ring according to claim 1, characterized in that the inverted over marginal region encloses the opening of the fuel tank connection, whilst leaving free an air gap.

3. Orifice ring according to claim 2, characterized in that longitudinal webs are provided on the inner wall of the inverted over marginal region.

4. Orifice ring according to claim 1, characterized in that a projection limiting the free opening of guide tube is provided in the latter.

5. Orifice ring according to claim 1, characterized in that a bead-like web is provided in guide tube at its end remote from the fuel tank cap.

6. Orifice ring according to claim 1, characterized in that it has locking means with which it can be locked on the fuel tank cap.

7. Orifice ring according to claim 6, characterized in that the locking means are so arranged in the interior of the inverted over marginal region that they are inaccessible when the orifice ring is engaged on the fuel tank cap.

8. Orifice ring according to claim 6, characterized in that it is provided on the inner wall of the inverted over marginal region with at least two projections displaced by 180° and in each case having a notch and into which can engage a radially projecting edge of the fuel tank cap.

9. Orifice ring according to claim 6, characterized in that it has several axial stops on the inner wall of the inverted over marginal region.

10. Orifice ring according to claim 1, characterized in that it has gripping notches on the outer wall of the inverted over marginal region.

11. Orifice ring for fixing to a self-sealing fuel tank cap (2), characterized in that it has a guide tube part (4) connected to the fuel tank cap (2), whilst leaving an annular-like air gap (3), the side of tube part (4) remote from fuel tank cap (2) passing into an inverted over marginal region (5), said region communicating with the opening of the fuel tank correction (6) whilst leaving free and air gap (7).

* * * * *